(12) United States Patent
Bennett et al.

(10) Patent No.: US 6,748,940 B2
(45) Date of Patent: Jun. 15, 2004

(54) COOKING ASSEMBLY HAVING MULTIPLE COOKING MODALITIES

(75) Inventors: Robb E. Bennett, New Prague, MN (US); Richard D. Berg, Lakeville, MN (US); Eric Hawkinson, Prior Lake, MN (US)

(73) Assignee: Fire Stone Home Products, LLC, Bloomington, MN (US)

( * ) Notice: Subject to any disclaimer, the term of this patent is extended or adjusted under 35 U.S.C. 154(b) by 48 days.

(21) Appl. No.: 09/885,360

(22) Filed: Jun. 20, 2001

(65) Prior Publication Data

US 2002/0195096 A1 Dec. 26, 2002

(51) Int. Cl.[7] .................................................. A47J 37/07
(52) U.S. Cl. .................................. 126/41 R; 126/25 R
(58) Field of Search ............................ 126/25 R, 39 R, 126/41 R (56) References Cited

U.S. PATENT DOCUMENTS

| | | | | |
|---|---|---|---|---|
| 1,215,653 A | * | 2/1917 | Hale | 126/39 R |
| 1,394,228 A | * | 10/1921 | Sheridan | 126/39 R |
| 2,542,577 A | | 2/1951 | Russell | |
| 2,580,939 A | | 1/1952 | Meriam | |
| 2,848,592 A | | 8/1958 | Mergen | |
| 3,169,573 A | * | 2/1965 | Hidaka | 126/39 R |
| 4,086,813 A | | 5/1978 | Meek et al. | |
| 4,309,585 A | | 1/1982 | Doi et al. | |
| 4,781,170 A | | 11/1988 | Perl | |
| 4,805,587 A | | 2/1989 | Schweitzer | |
| 4,960,101 A | * | 10/1990 | Home | 126/41 R |
| 5,617,778 A | * | 4/1997 | Schroeter et al. | 126/25 R |
| 5,960,781 A | | 10/1999 | Walter et al. | |
| 6,644,175 B2 | * | 11/2003 | Stephen et al. | 126/41 R |
| 2003/0188732 A1 | * | 10/2003 | Kahler et al. | 126/41 R |

* cited by examiner

*Primary Examiner*—Sara Clarke
(74) *Attorney, Agent, or Firm*—Merchant & Gould P.C.

(57) ABSTRACT

A cooking assembly for preparing food products having multiple cooking modalities is disclosed. In one embodiment of the disclosure, the cooking assembly can comprise a main body portion defining a cooking area and an adjustable burner assembly configured to provide heat to at least a portion of the cooking area. The adjustable burner assembly being positionable between a first cooking modality and a second cooking modality. The first cooking modality can provide a source of indirect heating to at least a portion of the cooking area. Conversely, the second cooking modality can provide a source of direct heating to at least a portion of the cooking area.

29 Claims, 5 Drawing Sheets

COOKING ASSEMBLY HAVING MULTIPLE COOKING MODALITIES

FIELD OF THE INVENTION

The present invention relates generally to a cooking assembly for preparing food products and, more particularly, to a cooking assembly for preparing food products having multiple cooking modalities.

BACKGROUND OF THE INVENTION

Cooking assemblies for preparing food products are well known in the art. Generally, many existing cooking assemblies provide a cooking compartment that defines either an open or enclosed cooking area (e.g., the primary cooking area). The cooking area can include one or more cooking surfaces that support the food products during cooking. Typically, a source of thermal energy is configured to provide heat to the entire cooking area. For example, many gas grill assemblies provide a burner assembly within the cooking compartment to provide heat to the entire cooking area. Conventional burner assemblies are rigidly mounted within the cooking compartment and, thus, limit the versatility of the grill assembly.

For example, as a result of having the burner assembly rigidly mounted to the cooking compartment, the operator is often required to carefully position the food products on the cooking surface to achieve the desired style of cooking. Alternatively, the operator can vary the level of heat introduced into the cooking area to achieve the desired style of cooking. While some existing grill assemblies provide auxiliary cooking surfaces in addition to those provided within the cooking area, these auxiliary cooking surfaces often use separate and distinct burner assemblies. Thus, existing grill assemblies do not easily allow the operator to prepare the food products using one or more cooking modalities.

Improvements in cooking assemblies are, therefore, sought.

SUMMARY OF THE INVENTION

In general terms, the present disclosure relates to a cooking assembly for preparing food products. More particularly, the present disclosure relates to a cooking assembly for preparing food products having multiple cooking modalities. In one aspect of the invention, the cooking assembly can comprise a main body portion defining a cooking area and an adjustable burner assembly configured to provide heat to at least a portion of the cooking area. The adjustable burner assembly is positionable between a first cooking modality and a second cooking modality.

In another aspect, a cooking assembly of the present disclosure can comprise a main body portion defining a cooking area and an adjustable burner assembly configured to provide heat to the cooking area. The adjustable burner assembly can comprise a first assembly member attached to the main body portion, a second assembly member in slidable engagement with the first assembly member, and an extension member secured to the second assembly member. The extension member can be configured to selectively position the burner assembly between a first cooking modality and a second cooking modality.

In another aspect, a cooking assembly of the present disclosure can comprise a cooking surface and an adjustable burner assembly. The cooking surface includes a first cooking surface for a first cooking modality and a second cooking surface for a second cooking modality. The adjustable burner assembly is configured to provide heat to at least a portion of the cooking surface. The adjustable burner assembly is positionable between the first cooking surface and the second cooking surface.

In another aspect of the present disclosure, an adjustable burner assembly is disclosed. The adjustable burner assembly can comprise a first assembly member, a second assembly member, and an extension member. The first assembly member is attached to a main body portion. The second assembly member is in slidable engagement with the first assembly member. The extension member is secured to the second assembly member for selectively positioning the burner assembly between a first cooking modality and a second cooking modality.

In another aspect, an adjustable burner assembly can comprise a first assembly member, a second assembly member, and an extension member. The second assembly member is in slidable engagement with the first assembly member. The extension member is secured to the second assembly member. The extension member is configured for selectively positioning the burner assembly between a first cooking surface for a first cooking modality and a second cooking surface for a second cooking modality.

In another aspect of the present disclosure, a method for preparing food products is disclosed. The method can comprise providing a cooking assembly comprising: a main body portion defining a cooking area; and an adjustable burner assembly being configured to provide heat to at least a portion of the cooking area; the adjustable burner assembly being positionable between a first cooking modality and a second cooking modality; and positioning the adjustable burner at the first cooking modality to prepare the food products using at least a first portion of the cooking area. In so doing, positioning the adjustable burner at the first cooking modality can comprise providing a source of indirect heating to at least the first portion of the cooking area.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

Various embodiments of the present invention will be described in detail with reference to the drawings, wherein like reference numerals represent like parts and assemblies throughout the several views. Reference to the various embodiments does not limit the scope of the present invention, which is limited only by the scope of the claims attached hereto.

Figure 1:
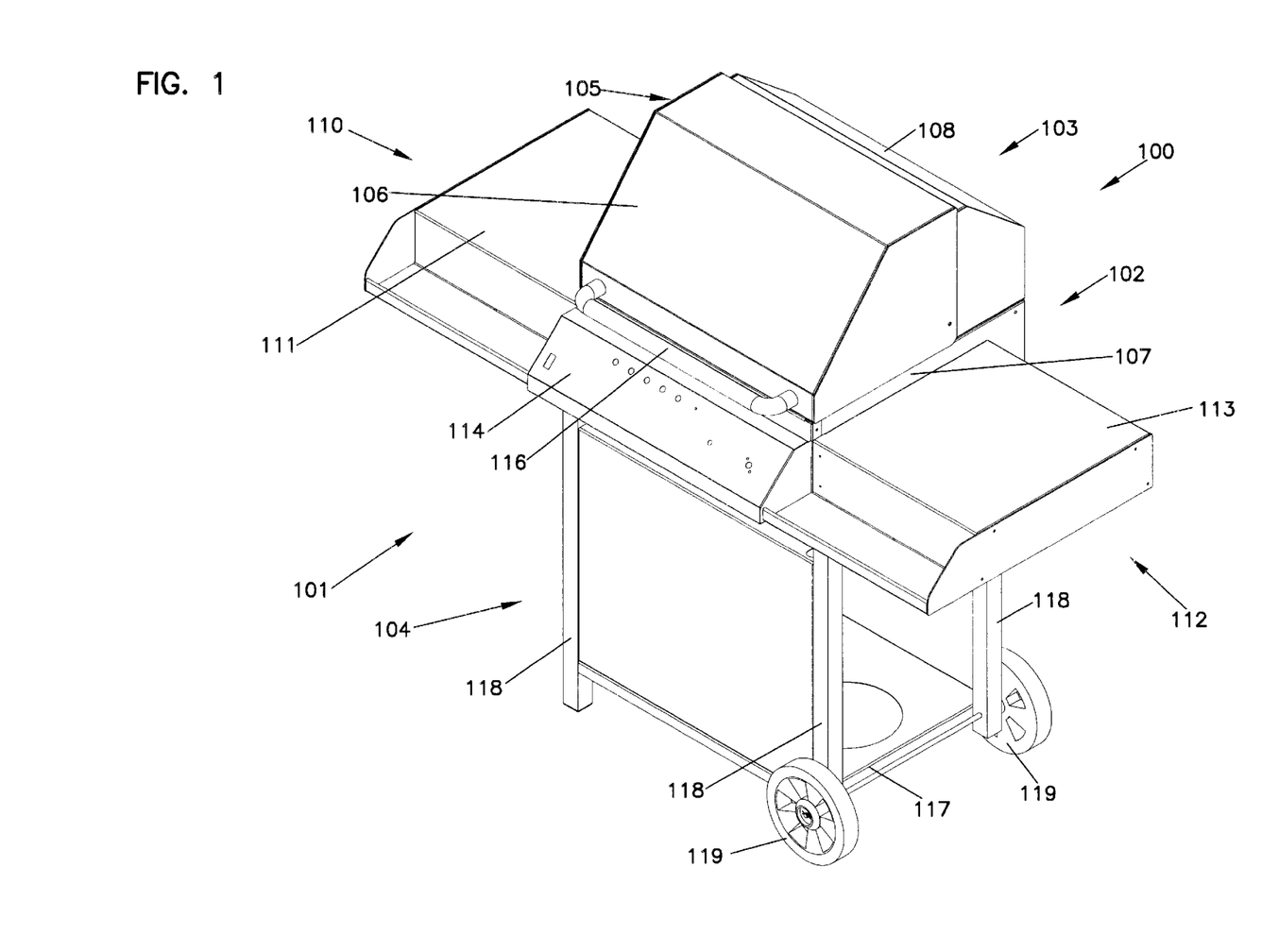
FIG. 1 is a perspective view of a cooking assembly for preparing food products in accordance with the principles of the present disclosure.
Figure 2:
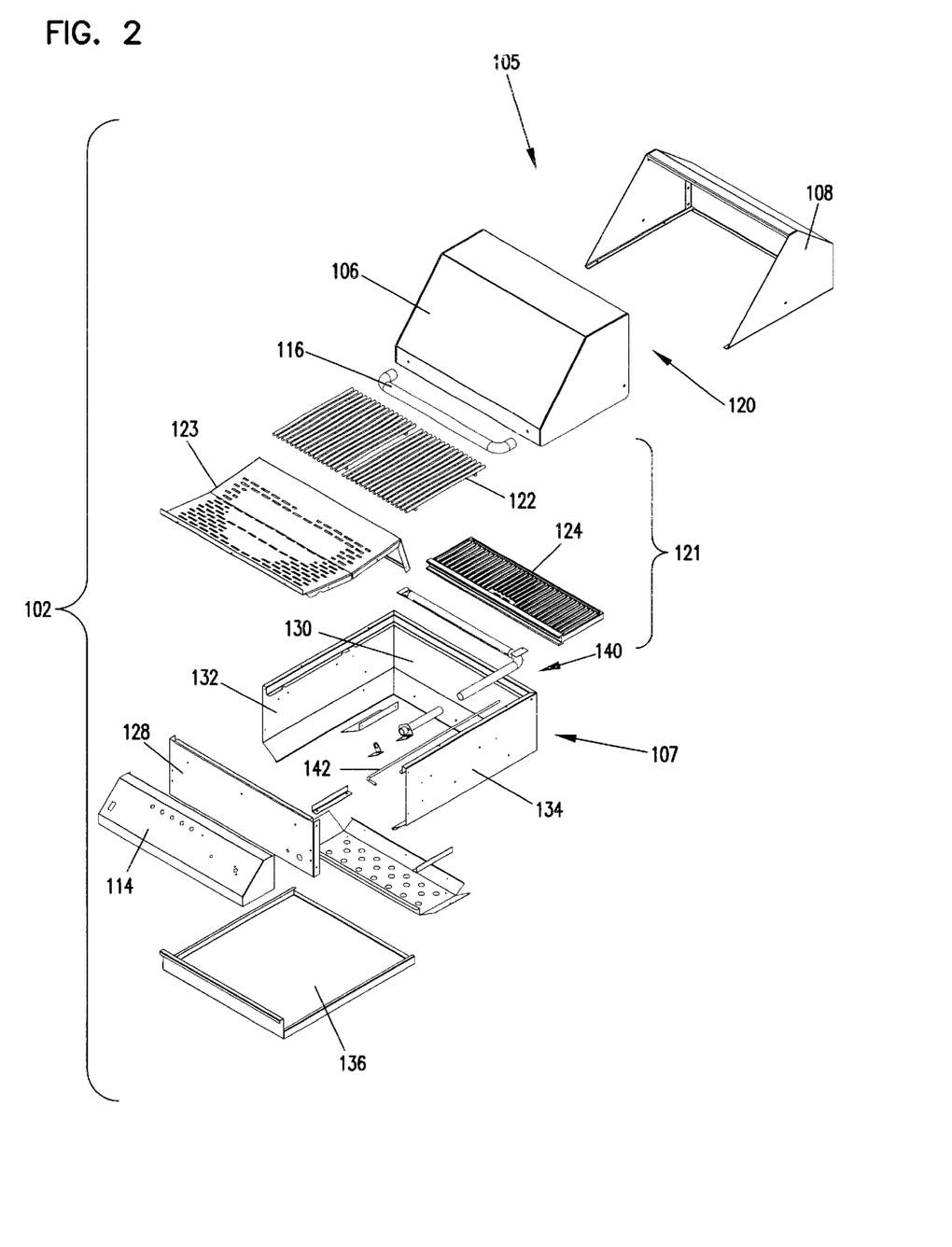
FIG. 2 is an exploded, perspective view of the cooking assembly for preparing food products of FIG. 1.

Now referring to FIG. 1, a cooking assembly 100 for preparing food products is shown. The phrase "food products" is generally meant to include any consumable product such as, meats, vegetables, fruits, or other food products, capable of being cooked and/or heated using a cooking assembly, such as a grill. In the embodiment illustrated in FIG. 1, the cooking assembly 100 has a front portion 101, a rear portion 103, a left side portion 110, and a right side portion 112. Moreover, the cooking assembly 100 also includes a main body portion 102 having a hood 105 and a burner housing 107. The hood 105 and the burner housing 107 cooperate to define an enclosable cooking area 120 (FIG. 2). In particular, in the embodiment illustrated in FIG. 1, the hood 105 comprises a front hood member 106 and a rear hood member 108. The front hood member 106 can be pivotably attached to the rear hood member 108. As a result of this configuration, the front hood member 106 is able to rotate backwards about the main body portion 102 between an opened position (not shown) and a closed position (as shown in FIG. 1) using, for example, a handle 116. By "rotate backwards," it is generally meant that in the orientation shown in FIG. 1, the front hood member 106 is able to rotate from the front 101 of the cooking assembly 100 towards the rear 103 of the cooking assembly 100, thereby, revealing the contents of the cooking area 120.

The cooking assembly 100 can include one or more shelf assemblies for supporting food products and/or cooking accessories during operation. In the embodiment illustrated in FIG. 1, the cooking assembly 100 includes a first side shelf assembly 111 secured at the left side 110 of the cooking assembly 100. Similarly, the cooking assembly 100 includes a second side shelf assembly 113 secured at the right side 112 of the cooking assembly 100. As mentioned above, the first and second side shelf assemblies 111, 113 can be used to support food products and/or various cooking accessories, including cooking utensils, marinades or other cooking utensils. Moreover, in one possible embodiment, the first and second side shelf assemblies 111, 113 can include one or more burner assemblies (not shown) that provide additional cooking surfaces. In such an embodiment, the one or more burner assemblies can be separately controlled.

The main body portion 102 is supported using a support arrangement 104. In one possible embodiment, the support arrangement can comprise a plurality of legs 118 supporting at least a portion of the cooking assembly 100. Additionally, in the illustrated embodiment shown in FIG. 1, one or more wheels 119 can be secured to the legs 118, thereby, allowing the cooking assembly 100 to be easily and readily moved. A shelf 117 can be provided at the support arrangement 104. The shelf 117 can be used to support, for example, one or more portable fuel tanks (not shown) containing a combustible substance, such as, propane or other combustible substances. As is generally understood, the combustible substance can be ignited within the cooking compartment 107 to provide heat to the cooking area 120. While the illustrated embodiment is configured to operate with a portable fuel tank, one having ordinary skill in the art will readily appreciate that the cooking assembly 100 of the present disclosure can be configured to operate using a direct supply of fuel, such as, by being directly connected to the natural gas supply of a building (e.g., the operator's home).

FIG. 2 illustrates an exploded view of the main body portion 102 of the cooking assembly 100. As shown in FIG. 2, the hood 105 and the burner housing 107 cooperate to define a partially enclosed cooking area 120. A source of thermal energy is provided to the cooking area 120 sufficient to adequately cook the food products disposed within the cooking area 120. The source of thermal energy will be described in greater detail below. As shown in FIG. 2, the cooking area 120 generally comprises a cooking surface 121 for supporting the food products while the cooking assembly 100 is in use. In one possible embodiment, the cooking surface 121 can comprise multiple cooking surfaces capable of providing multiple cooking modalities. For example, as shown in FIG. 2, the cooking surface 121 can comprise a first cooking surface 122 and a second cooking surface 124. The first cooking surface 122 can comprises a grill situated and arranged adjacent to a diffuser plate 123 as shown in FIG. 2. When the first cooking surface or grill 122 is used in conjunction with a diffuser plate 123, the diffuser plate 123 can evenly distribute the heat from the heat source. As a result, the first cooking surface or grill 122 can provide a source of indirect heating. Conversely, the second cooking surface 124 can comprise, for example, a searing plate that can be used to sear the food products being cooked. As a result, the second cooking surface 124 can provide a source of direct heating. In other configurations, the first surface can, for example, be a searing plate and the second cooking surface can be, for example, a grill.

Accordingly, the first and second cooking surfaces 122, 124 allow the cooking assembly 100 to accommodate multiple cooking styles, such as, for example, an indirect heating style of cooking (e.g., convection, etc.) or, alternatively, a direct heating style of cooking (e.g., searing, broiling, grilling etc.). Alternatively, more than two cooking surface can be used to provide additional cooking styles to a single cooking assembly.

To accommodate multiple cooking styles, the cooking assembly 100 includes a source of thermal energy configured for selectively providing at least a first cooking modality and a second cooking modality. While many cooking arrangements are contemplated, in the illustrated embodiment, the cooking assembly 100 includes an adjustable burner assembly 140 disposed within the burner housing 107. The adjustable burner assembly 140 can be included in cooking assemblies, such as cooking assembly 100, or can be included in any other cooking assembly, such as stoves.

Preferably, the adjustable burner assembly 140 is configured to provide heat to at least a portion of the cooking area 120. Furthermore, the adjustable burner assembly 140 is positionable between at least a first position and a second position, thereby, allowing the operator to selectively control the style of cooking and/or location of cooking at the cooking surface 121. For example, as shown in FIG. 2, an extension member 142 can be provided that allows the operator to selectively position the adjustable burner assembly 140 between the first cooking modality and the second cooking modality. The adjustable burner assembly 140 will be described in greater detail below in conjunction with FIGS. 3 through 6. In other cooking assembly configurations, more than two cooking modalities can be provided.

As shown in FIG. 2, the burner housing 107 can comprise a front wall 128, a rear wall 130 opposite the front wall 128, and first and second sidewalls 132, 134 extending between the front and rear walls 128, 130. A drip pan 136 can be provided below the burner housing to catch and/or contain drippings and/or other cooking residue drawn from the food products during cooking. In one possible embodiment, the drip pan 136 can be secured to the burner housing 107 via a tongue and groove arrangement (not shown). In so doing, the drip pan 136 can be readily and easily removed from the burner housing 107 to facilitate cleaning of the cooking assembly 100.

In the embodiment illustrated in FIG. 2, a control panel 114 can be secured to the front wall 128 of the burner housing 107. The control panel 114 generally includes one or more controls (not shown) that allow the operator to regulate various cooking parameters, such as, cooking temperature, timers, etc., while the cooking assembly 100 is in use. The controls that can be available on the control panel 114 will be discussed in greater detail below.

Figure 3:
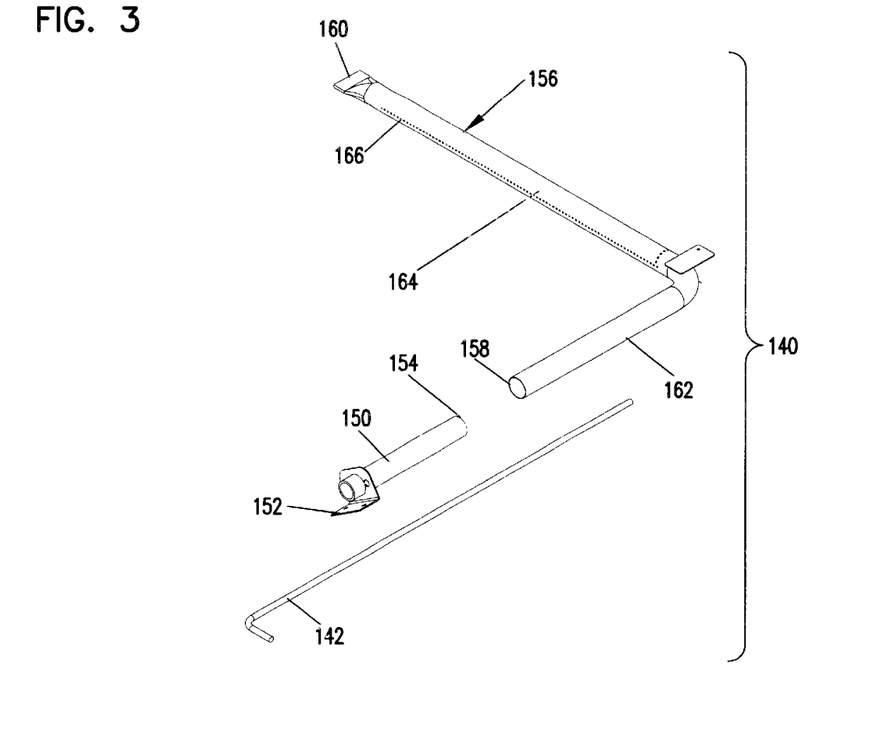
FIG. 3 is an enlarged, perspective view of an adjustable burner assembly in accordance with the principles of the present disclosure.

As shown in FIG. 3, the adjustable burner assembly 140 can include a first assembly member 150 that can be attached to the burner housing 107. The adjustable burner assembly 140 also includes a second assembly member 156 that is in slidable engagement with the first assembly member 150. By "slidable engagement," it is generally meant that the second assembly member 156 is constructed and arranged to either slide within or over the first assembly member 150. In the illustrated embodiment, the second assembly member 156 has an inside diameter greater than the outside diameter of the first assembly member 150. Accordingly, in this configuration, the second assembly member 156 is constructed and arranged to slide over the first assembly member 150. In so doing, the second assembly member 156 can be selectively positioned within the burner housing 107 between a first cooking position and a second cooking position. As discussed above, when the burner assembly 140 is positioned at the first cooking position, the cooking assembly 100 is configured to provide a first cooking modality, such as, a source of indirect heating (e.g., convection heating). Conversely, when the burner assembly 140 is positioned at the second cooking position, the cooking assembly 100 is configured to provide a second cooking modality, such as, a source of direct heating (e.g., searing, etc.).

Alternatively, the adjustable burner assembly can be constructed as a single unit. The single unit adjustable burner assembly can include a collapsible hose construction in which the adjustable burner assembly is either lengthened or shortened when the position of the adjustable burner assembly is altered.

The first assembly member 150 has a first end 152 and a second end 154. As discussed above, the first assembly member 150 is fixed to the burner housing 107 of the cooking assembly 100. In one possible embodiment, the first assembly member 150 can be a generally tubular member having a first end 152 and a second end 154 opposite the first end 152. A combustible substance can be provided to the burner assembly 140 though the first end 152 of the first assembly member 150.

As shown in the embodiment illustrated in FIG. 3, the second assembly member 156 can be a generally tubular member having a first end 158 and a second end 160. Moreover, the second assembly member 156 also has a longitudinal portion 162 and a transverse portion 164.

Figure 5:
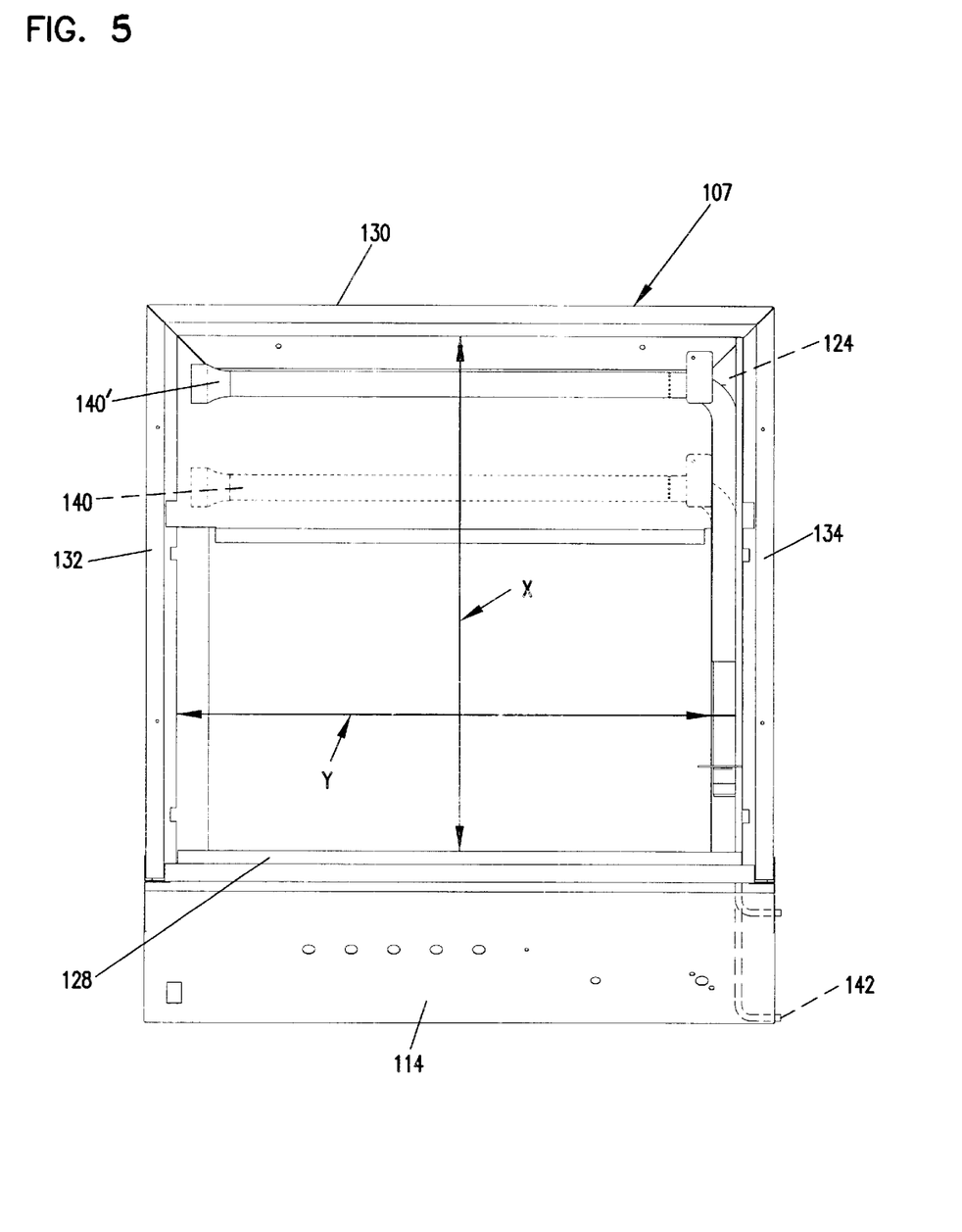
FIGS. 5 and 6 are top views of the cooking assembly of the present disclosure showing the burner assembly being positioned in the first and second cooking positions in accordance with the principles of the present disclosure.

FIG. 5 illustrates the burner housing 107 including a selectively adjustable depth X and a selectively adjustable width Y. The selectively adjustable depth X and selectively adjustable width Y correspond to a same depth and width for the cooking area 120. The longitudinal portion 162 of the second assembly member 156 extends across at least a portion of the selectively adjustable depth X (FIG. 5) of the burner housing 107. In particular, the longitudinal portion 162 extends partially between the front and rear walls 128, 130 (FIG. 2) of the burner housing 107. Conversely, the transverse portion 164 of the second assembly member 156 extends substantially perpendicular to the longitudinal portion 162 across at least a portion of the selectively adjustable width Y (FIG. 5) of the burner housing 107. In particular, the transverse portion 164 extends partially between the first and second sidewalls 132, 134 (FIG. 2) of the burner housing 107.

Alternatively, the longitudinal portion can extend across at least a portion of the selectively adjustable width Y and the transverse portion can extend across at least a portion of the selectively adjustable depth X. The adjustable burner can also be moved either closer to or further from the cooking surface or surfaces of the cooking assembly to adjust heat intensity.

Additionally, the transverse portion 164 defines a plurality of perforations 166 that are configured to deliver a combustible substance into the cooking area 120. While the illustrated embodiment of the second assembly member 156 is generally L-shaped, one having ordinary skill in the art will readily appreciate that the second assembly member 156 can be any suitable shape, such as T-shaped.

Figure 4:
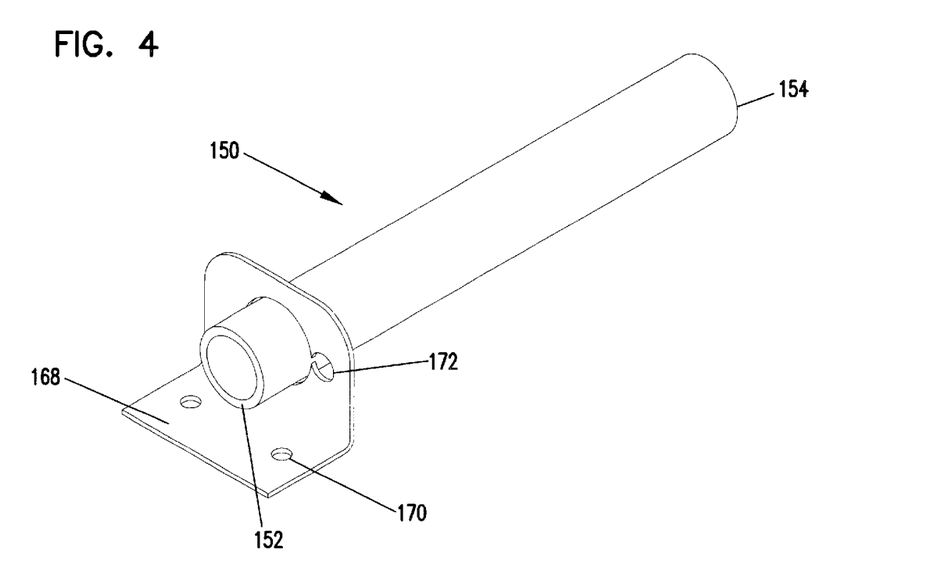
FIG. 4 is an enlarged, perspective view of a portion of the adjustable burner assembly of FIG. 3 in accordance with the principles of the present disclosure.

FIG. 4 illustrates an enlarged, perspective view of the first assembly member 150. The second end 154 of the first assembly member 150 is sized and configured to slidably engage the first end 158 of the second assembly member 156. Furthermore, as discussed above, the first assembly member 150 is preferably secured to the burner housing 107 of the cooking assembly 100 while the second assembly member 156 can be selectively moved relative to the first assembly member 150. The first assembly member 150 can be secured to the burner housing 107 of the grill assembly 100 using, for example, any suitable attachment device and/or structure, such as, one or more mounting brackets, one or more conventional fasteners, welds, or other attachment devices and/or structure. In the illustrated embodiment, the first assembly member 150 is attached to the burner housing 107 using a mounting bracket 168. The mounting bracket 168 can generally define one or more holes for securing the mounting bracket 168 to the burner housing 107. Additionally, the mounting bracket 168 defines a guide member 172 that is preferably, configured to receive the extension member 142, thereby, allow the operator to selectively position the adjustable burner assembly 140 at a desired cooking modality.

FIG. 5 illustrates a top view of the burner housing 107 (FIG. 2) including the adjustable gas burner assembly 140. In particular, the adjustable burner assembly 140 is shown in a first position forward towards the front wall 128 of the burner housing 107. In the second position, the adjustable burner assembly 140' is shown in a second position adjacent to the rear wall 130 of the burner housing 107.

Figure 6:
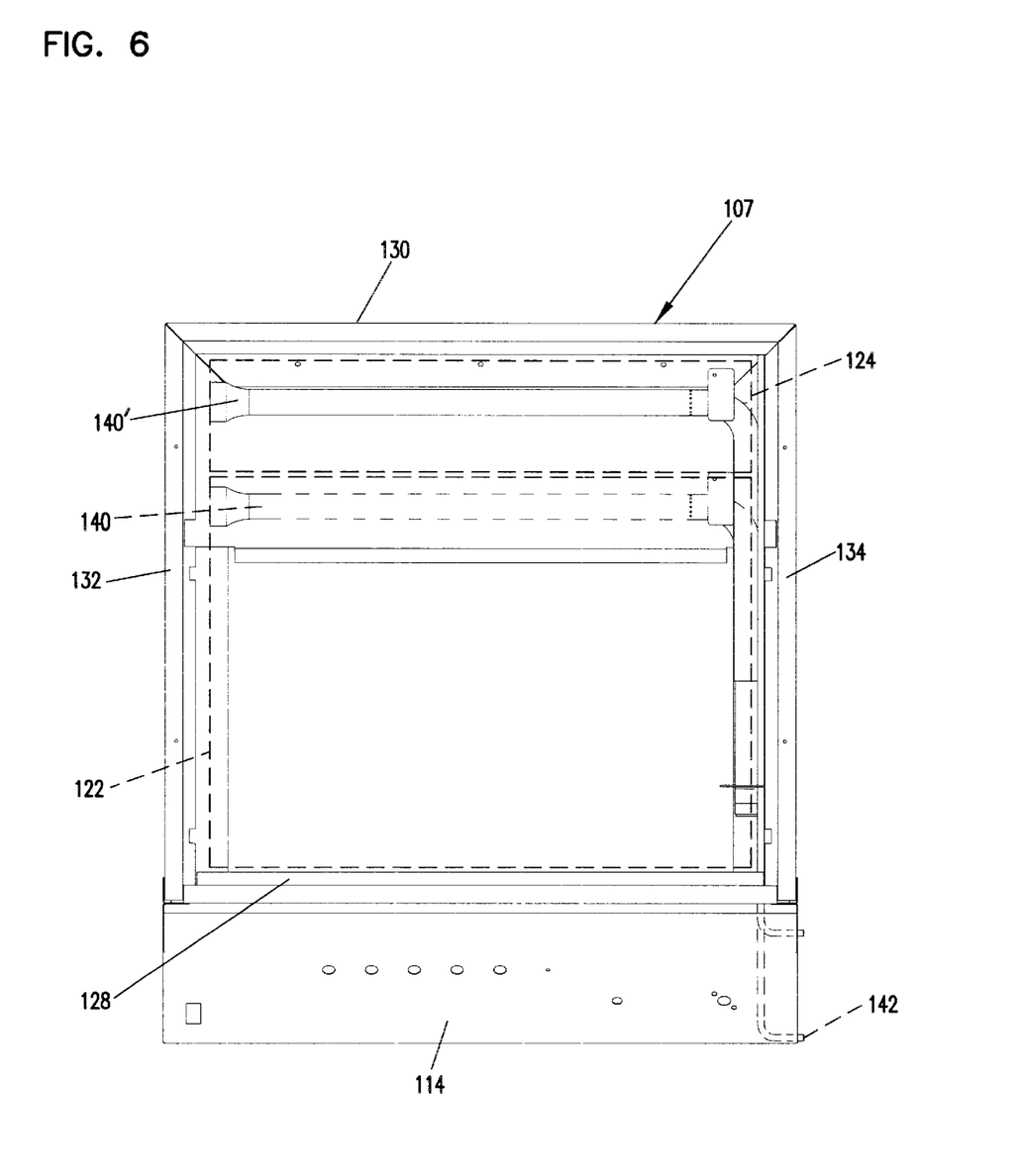

In the first position, the adjustable burner assembly 140 operates in a first cooking modality capable of providing heat to at least a portion of the cooking area 120. In one possible embodiment, the adjustable burner assembly 140 in the first cooking modality is configured to provide a source of indirect heating (e.g., convection, etc.) to the first cooking surface 122. Thus, as shown in FIG. 6, the adjustable burner assembly 140 in the first position (e.g., the first cooking modality) is situated and arranged adjacent to the first cooking surface 122. Conversely, in the second position, the adjustable burner assembly 140' operates in a second cooking modality capable of providing heat to a least a separate portion of the cooking area 120. In one possible embodiment, the adjustable burner assembly 140' in the second cooking modality is configured to provide a source of direct heating (e.g., searing, broiling, etc.) to the second cooking surface 124. Thus, as shown in FIG. 6, the adjustable burner assembly 140' in the second position (e.g., the second cooking modality) is situated and arranged adjacent to the second cooking surface 124.

The various embodiments described above are provided by way of illustration only and should not be construed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

The claimed invention is:

1. A cooking assembly for preparing food products, the cooking assembly comprising:
   (a) a main body portion defining a cooking area including a first cooking surface and a second cooking surface, wherein the second cooking surface is a searing plate; and
   (b) an adjustable burner assembly being configured to provide heat to at least a portion of the cooking area; the adjustable burner assembly being positionable between a first cooking modality providing a source of indirect heating to the first cooking surface and a second cooking modality providing a source of direct heating to the second cooking surface.

2. The cooking assembly according to claim 1, wherein the adjustable burner assembly is substantially L-shaped.

3. The cooking assembly according to claim 1, wherein the first cooking surface includes a grill situated and arranged above a diffuser plate.

4. A cooking assembly for preparing food products, the cooking assembly comprising:
   (a) a main body portion defining a cooking area;
   (b) an adjustable burner assembly being configured to provide heat to the cooking area, the adjustable burner assembly comprising:
      (i) a first assembly member attached to the main body portion;
      (ii) a second assembly member in slidable engagement with the first assembly member; and
      (iii) an extension member secured to the second assembly member; the extension member for selectively positioning the burner assembly in a substantially horizontal direction between a first cooking modality and a second cooking modality.

5. The cooking assembly according to claim 4, wherein the adjustable burner assembly is substantially L-shaped.

6. The cooking assembly according to claim 4, wherein the burner assembly is disposed within a burner housing and the second assembly member includes:
   (a) a longitudinal portion extending across at least a portion of a depth of the burner housing; and
   (b) a transverse portion substantially perpendicular to the longitudinal portion; the transverse portion extending laterally across at least a portion of a width of the burner housing.

7. The cooking assembly according to claim 6, wherein the transverse portion includes a plurality of perforations configured to deliver a combustible substance into the cooking area.

8. The cooking assembly according to claim 4, wherein the second assembly member is disposed ova the first assembly member to define a clearance fit between the first assembly member and the second assembly member.

9. The cooking assembly according to claim 4, wherein:
   (a) the first assembly member is substantially tubular having an outer diameter; and
   (b) the second assembly member is substantially tubular having an inner diameter greater than the outer diameter of the first assembly such that the second assembly member is in slidable engagement with the first assembly member.

10. The cooking assembly according to claim 4, wherein the first cooking modality provides a source of indirect heating to at least a portion of the cooking area.

11. The cooking assembly according to claim 4, wherein the second cooking modality provides a source of direct heating to at least a portion of the cooking area.

12. The cooking assembly according to claim 4, wherein the cooking area comprises a first cooking surface and a second cooking surface; wherein further:
   (a) the first cooking modality provides a source of direct heating to the first cooking surface; and
   (b) the second cooking modality provides a source of indirect heating to the second cooking surface.

13. The cooking assembly according to claim 12, wherein the first cooking surface includes a grill situated and arranged above a diffuser plate.

14. The cooking assembly according to claim 12, wherein the second cooking surface is a searing plate.

15. A cooking assembly fin preparing food products, the cooking assembly comprising:
   (a) a cooking surface comprising a first cooking surface for a first cooking modality and a second cooking surface for a second cooking modality;
   (b) an adjustable burner assembly being configured to provide heat to at least a portion of the cooking surface; the adjustable burner assembly being positionable between the first cooking surface and the second cooking surface; and
   (c) an extension member secured to the adjustable burner assembly to move the adjustable burner assembly substantially horizontally between the first cooking surface and the second cooking surface.

16. The cooking assembly according to claim 15, wherein the first cooking modality provides a source of indirect heating to at least a portion of the cooking area.

17. The cooking assembly according to claim 15, wherein the second cooking modality provides a source of direct heating to at least a portion of the cooking area.

18. An adjustable burner assembly for preparing food products, the adjustable burner assembly comprising:
   (a) a first assembly member attached to a main body portion;
   (b) a second assembly member in slidable engagement with the first assembly member; and
   (c) an extension member secured to the second assembly member, the extension member being configured for selectively positioning the burner assembly in a substantially horizontal direction between a first cooking modality and a second cooking modality.

19. The adjustable burner assembly according to claim 18, wherein the adjustable burner assembly is substantially L-shaped.

20. The adjustable burner assembly according to claim 18, wherein the second assembly member is in communication with a cooking area, the second assembly member including:
（a) a longitudinal portion extending across a depth of a burner housing; and
(b) a transverse portion substantially perpendicular to the longitudinal portion; the transverse portion extending laterally across a width of the cooking area.

21. The adjustable burner assembly according to claim 20, wherein the transverse portion includes a plurality of perforations configured to deliver a combustible substance into the cooking area.

22. The adjustable burner assembly according to claim 18, wherein the second assembly member is disposed over the first assembly member to define a clearance fit between the first assembly member and the second assembly member.

23. The adjustable burner assembly according to claim 18, wherein:
(a) the first assembly member is substantially tubular having an outer diameter; and
(b) the second assembly member is substantially tubular having an inner diameter larger than the outer diameter of the first assembly such that the second assembly member is in slidable engagement with the first assembly member.

24. The adjustable burner assembly according to claim 18, wherein the first cooking modality provides a source of indirect heating to at least a portion of a cooking area.

25. The adjustable burner assembly according to claim 18, wherein the second cooking modality provides a source of direct heating to at least a portion of a cooking area.

26. A method for preparing food products, the method comprising:
(a) providing a cooking assembly comprising:
(i) a main body portion defining a cooking area; and
(ii) an adjustable burner assembly being configured to provide heat to at least a portion of the cooking area, the adjustable burner assembly being positionable using an extension member between a first cooking modality and a second cooking modality;
(b) positioning the adjustable burner in a substantially horizontal direction at the first cooking modality to prepare the food products using at least a first portion of the cooking area; and
(c) positioning the adjustable burner at the second cooking modality to provide a source of direct heating to at least a second portion of the cooking area to prepare the food products using at least the second portion of the cooking area.

27. The method according to claim 26, wherein positioning the adjustable burner at the first cooking modality comprises providing a source of indirect heating to at least the first portion of the cooking area.

28. The method according to claim 26, wherein the first portion of the cooking area includes a grill situated and arranged above a diffuser plate.

29. The method according to claim 26, wherein the second portion of the cooking area is a searing plate.

* * * * *

UNITED STATES PATENT AND TRADEMARK OFFICE
CERTIFICATE OF CORRECTION

PATENT NO. : 6,748,940 B2 Page 1 of 1
DATED : June 15, 2004
INVENTOR(S) : Bennett et al.

It is certified that error appears in the above-identified patent and that said Letters Patent is hereby corrected as shown below:

Column 8,
Line 6, "is disposed ova" should read -- is disposed over --
Line 36, "assembly fin" should read -- assembly for --

Signed and Sealed this

Eighth Day of March, 2005

JON W. DUDAS
*Director of the United States Patent and Trademark Office*